United States Patent [19]
Dausch et al.

[11] Patent Number: 5,436,839
[45] Date of Patent: Jul. 25, 1995

[54] NAVIGATION MODULE FOR A SEMI-AUTONOMOUS VEHICLE

[75] Inventors: Mark E. Dausch, Latham; Bernard J. Carey; Piero P. Bonissone, both of Schenectady, all of N.Y.

[73] Assignee: Martin Marietta Corporation, Syracuse, N.Y.

[21] Appl. No.: 966,472

[22] Filed: Oct. 26, 1992

[51] Int. Cl.6 ............................................ G06F 165/00
[52] U.S. Cl. .................................... 364/449; 395/94; 348/135
[58] Field of Search .................. 364/424.02, 449, 460, 364/461; 318/587; 382/1, 19, 25, 26; 395/3, 61, 94; 348/113, 118, 119, 135, 148

[56] References Cited

U.S. PATENT DOCUMENTS

| | | | |
|---|---|---|---|
| 5,081,585 | 1/1992 | Kurami et al. | 364/424.02 |
| 5,122,957 | 6/1992 | Hattori | 364/424.02 |
| 5,170,352 | 12/1992 | McTamaney et al. | 364/424.02 |
| 5,249,126 | 9/1993 | Hattori | 364/424.02 |

OTHER PUBLICATIONS

Williams et al; Fuzzy Logic Simplified Complex Control Problems; Computer Design; Mar. 1, 1991; pp. 90–102.

Karr et al; Fuzzy Process Control of Spacecraft Autonomous Rendevous Using a Genetic Algorithm; SPIE vol. 1196 Intelligent Control and Adaptive Systems; Nov. 1989; pp. 274–288.

*Primary Examiner*—Kevin J. Teska
*Assistant Examiner*—Michael Zanelli
*Attorney, Agent, or Firm*—Paul Checkovich; Stephen A. Young

[57] ABSTRACT

A fuzzy logic based navigation module for use on a semi-autonomous vehicle computes the safety of moving from predefined local regions to adjacent local regions for the purpose of planning a safe path for the vehicle to take to reach its intended destination. Image understanding software provides the input to the system in the form of values for linguistic variables for each local region which impact the safe movement of the vehicle. Using a five level hierarchial rule base structure, the fuzzy inference process computes intermediate and final safety values which are affected not only by local conditions but also by nearby conditions in order to allow a minimum clearance for the vehicle.

9 Claims, 5 Drawing Sheets

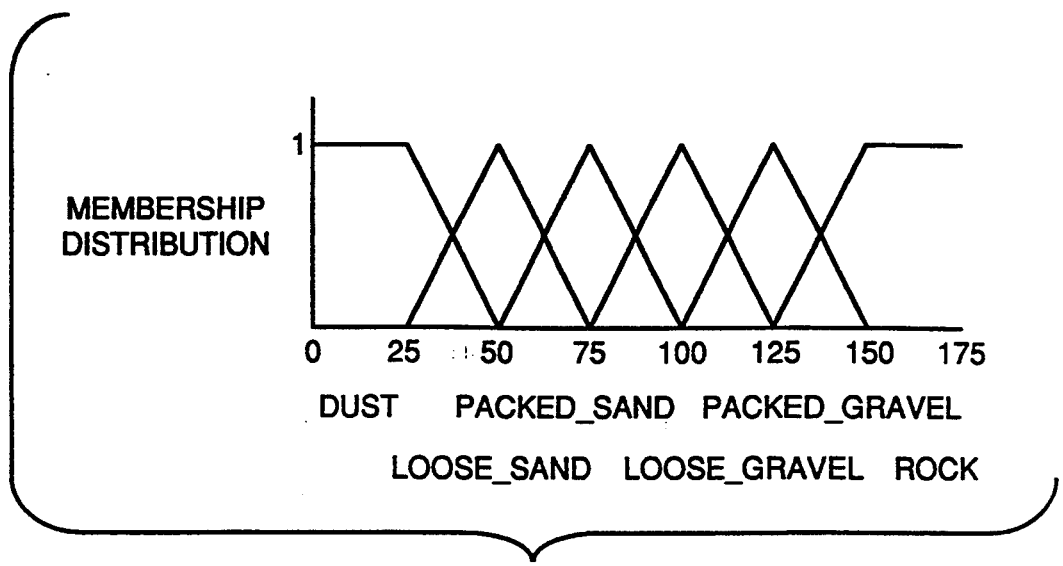
fig. 2
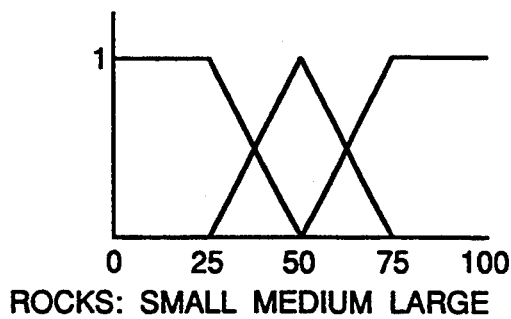
fig. 3
fig. 4
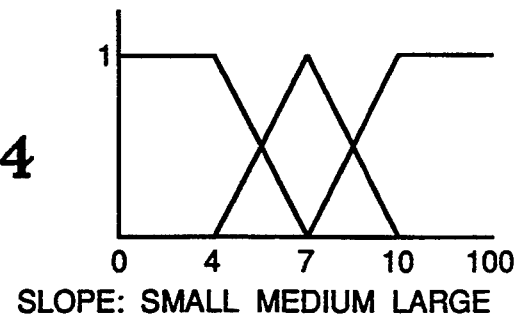
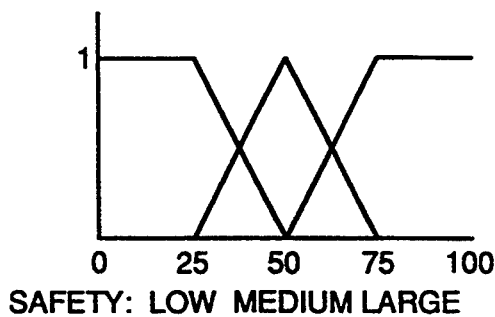
fig. 5

NAVIGATION MODULE FOR A SEMI-AUTONOMOUS VEHICLE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention relates in general to the field of fuzzy logic and more particularly to the use of fuzzy logic to help navigate a semi-autonomous vehicle such as the Mars Rover.

It is envisioned that certain exploration functions—planetary, space, undersea—will best be performed by unmanned vehicles capable of operating with minimal supervision by a remote human operator. Such vehicles are termed semi-autonomous as they must operate for periods of time in a completely autonomous manner. During these periods of the autonomous behavior, an on-board subsystem must navigate the vehicle through a potentially hazardous environment to a selected destination and guarantee the safety of the vehicle during transit. This navigation system must be provided information about the features of the terrain or space to be traversed so as to choose a best path and avoid any hazards. It is anticipated that such data will be provided by both external sources and on-board sensor subsystems. In addition to acquiring gross information about the terrain or space to be traversed from an external source, such as an orbiting satellite for planetary exploration, it is anticipated that more fine grained data will be acquired from on-board sensor subsystems such as optical vision modules. Data from these disparate sources must be integrated to describe the terrain or space to be traversed. However, the inputs which it receives about the environment from these various sources—image understanding software, maps, satellites—will most probably be uncertain and incomplete. This information can be uncertain because there could be evidence which supports the data but there also could be evidence which refutes the data. For the example of a planetary semi-autonomous vehicle, the image understanding software could determine that a certain region is composed of packed gravel, which would be safe but the degree of belief might not be 100% and the region in question could also contain loose gravel, which is unsafe. The information may be incomplete as certain sections of the terrain may not be accessible to the sensors or may contain features which can not be distinguished by the sensors.

In order to navigate in an environment which is not completely known and understood, the navigation module needs to reason with the uncertain information and compute the best path—criteria such as shortest distance, minimum time, and least power consumed—which also guarantees the safety of the vehicle.

Existing systems are essentially deterministic in that they follow a fixed set of rules and assume complete and accurate data about the environment to be traversed. When that assumption fails, the navigation system typically fails.

SUMMARY OF THE INVENTION

In accordance with the present invention, a method and apparatus for determining the safety of moving among various regions in a partially unknown terrain is provided. Fuzzy logic is used to classify the various local regions with respect to the safety of moving from one region to another. This information can be used as input to known path planning algorithms for global path planning.

The fuzzy logic based navigation module of the present invention has input variables defined for terrain type, rock size, and slope between local regions. A local region is defined as a hex shaped area within the sensor range of a vehicle to be navigated. The fuzzy logic system can be embedded on a microprocessor on board the vehicle. Each hex (or pair of neighboring hexes) has associated with it a value for each of the input variables. These values are determined by an image processing module which is external to the present invention. The fuzzy logic system further comprises a set of rules, or knowledge base, organized into a hierarchical structure of five levels. Level 1 determines a regional safety value for a cluster of seven hexes based on terrain type and rock size. Level 2 determines a directional safety value for traveling from the center of the cluster to its six adjacent hexes based on regional safety and slope. Level 3 determines a new regional safety value for the center hex based on the regional safety of the adjacent hexes. Level 4 determines new directional safety values based on the directional safety of adjacent hexes. Level 5 determines final directional safety values based on the level 4 values and the regional safety of the center hex. Each hex is processed by the fuzzy rule base as the center hex of a cluster and upon processing every hex, a mapping of safety values for moving from every hex to an adjacent hex is produced. With this information, a best path can be selected for getting from one point on the terrain to a target point. The fuzzy logic system of the present invention can be built using currently existing tools which allow a developer to write the rules in a high level English like language to be compiled into C-code for a target processor.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 2 shows fuzzy membership functions for terrain type;

FIG. 3 shows fuzzy membership functions for rocks;

FIG. 4 shows fuzzy membership functions for slope;

FIG. 5 shows fuzzy membership functions for safety;

DETAILED DESCRIPTION OF THE INVENTION

Figure 1:
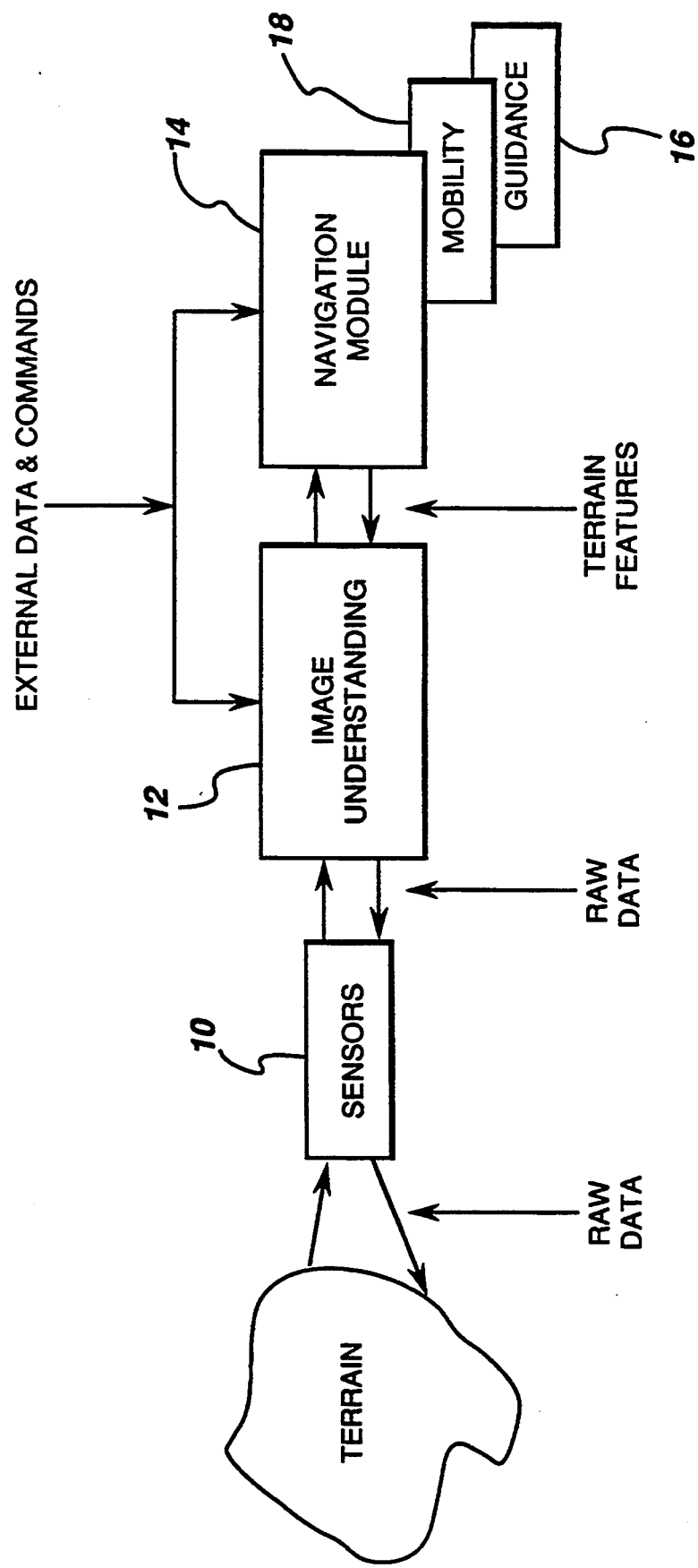
FIG. 1 is a block diagram of a navigation system within which the present invention can be practiced.

Referring now to FIG. 1, a block diagram of the modules required for a semi-autonomous vehicle navigation system is shown. Sensor Module 10 provides raw terrain data to Image Understanding Module 12. This data might originate from a variable depth range camera, 2D stereo camera, or other types of known sensors. Image Understanding Module 12 processes the data transmitted by Sensor Module 10 and extracts certain features that have been identified. These features include terrain type (dust, loose sand, packed sand, loose gravel, packed gravel, and rock), slope, and rocks. Pictures from an orbiter could also be used to facilitate the feature identification and extraction process. After the Image Understanding Module 12 has completed the features extraction from the current sector within sensor range, the feature information is formatted in some predefined manner and then communicated to Navigation Module 14. Navigation Module 14 utilizes a priori information (a precomputed path based on pictures collected from an orbiter and relayed to Earth), along with features determined locally by the Sensor Module 10 and Image Understanding Module 12, to compute a local path for the vehicle which minimizes the deviation from the precomputed path while maintaining minimal object clearance, inclination, and other traversal safety parameters. The computed safe path is then sent to Guidance Module 16. Guidance Module 16 calculates the required steering commands from the path coordinates using the vehicle's location and transmits this information to Mobility Module 18. Mobility Module 18 receives, processes, and implements the steering commands transmitted by Guidance Module 16 and also monitors the vehicle's motion and manages the interfaces with the lower level systems or modules such as motors, controls, feedback systems, and sensors. Upon completion of local sensor data collection, image processing, navigation, and movements, the vehicle is at a new position and the cycle repeats.

The focus of the present invention is on Navigation Module 14. The particular problem solved by the present invention is how to process the large amount of information extracted by Image Understanding Module 12 concerning the terrain type, slope and rocks within a given sector, in such a way as to provide a useful input to various known path planning algorithms. Fuzzy logic is used as the underlying reasoning mechanism to label regions within the sector, as having some degree of safety, thus the present invention is referred to herein as a fuzzy region classifier. Other possible parameters besides safety, such as fuel consumption, region traversibility, cohesion of terrain type, distance from current to goal hex, and distance from start to current hex could also be used, but the implementation described herein uses safety as the criterion for computing a best path. For purposes of the description of the present invention, it can be assumed that Image Understanding Module 12 is able to analyze features contained in hex shaped areas of a size equal to the resolution of the Image Understanding Module 12, which may be one meter for example. Associated with each hex are the attributes, or features, which are extracted by Image Understanding Module 12. Each hex has a terrain type (a coefficient of traction), six slope values (tenths of meters relative to its six neighbor hexes), a rock value (size in centimeters), and coordinates in a user defined coordinate system.

The input to the navigation module of the present invention is a set of hexes as explained above. As also mentioned above, fuzzy logic is used to determine a safety value for each hex based on the characteristics of each hex. Fuzzy logic is a formulation of logic that deals with fuzzy concepts such as very, few, and many in a rigorous mathematical framework. It utilizes IF . . . THEN type rules comprised of linguistic variables. A linguistic variable is one whose value is one or more words rather than a number. For example, in the statement "air is hot" the linguistic variable, temperature, has the linguistic value "hot" for air. The mathematical theory of fuzzy logic is well known in the art and numerous references exist which describe the way in which the fuzzy inference process applies a set of fuzzy rules to a set of linguistic input variables (whose values may be certain or fuzzy themselves) to determine crisp (non-fuzzy) values for a set of linguistic output variables. Commonly assigned, co-pending U.S. patent application Ser. No. 07/775,873 provides such a detailed description of the fuzzy inference process and is incorporated herein by reference for background purposes.

In creating the navigation module of the present invention, much of the software was generated automatically by the Fuzzy C compiler from Togai InfraLogic, Inc. This tool allows the developer to build the fuzzy logic knowledge base in a high level English like language (see Appendix A). Once the rules are completed, they are converted into C, which can be linked to other software modules. The fuzzy logic knowledge base can also be converted into assembly code for a target processor using Togai InfraLogic FPL (micro Fuzzy Programming Language) Development System. This is a set of tools for developing microcomputer based embedded fuzzy logic systems. With the appropriate compilers and/or assemblers, the fuzzy logic system of the present invention can be embedded in a navigation system such as shown in FIG. 1.

Appendix A contains a complete source code listing embodying the present invention. Upon compilation of this source code, an object code version of the program can be run on a target microprocessor to perform the fuzzy region classification given an input set of hexes as explained above. Each hex is evaluated with respect to the rules contained therein and the result is a directional safety value assigned to each pair of adjacent hexes. Appendix A contains the complete description of all of the linguistic variables used and their corresponding termset definitions and a complete description of all of the rules used to determine direct and safety values. Each hex is surrounded by six neighbor hexes and the fuzzy rules take into account not only the characteristics of the hex being classified but also the characteristics of its neighbor hexes.

The classification scheme of the present invention is divided into a hierarchical structure with five levels. Each level examines certain characteristics of the hexes and possibly the neighbor hexes to determine the safety values for that hex. The results from lower levels of classification are provided as input to a higher level. After describing the input variables, these five levels of rules will be described.

There are six types of terrain defined. These include dust, loose sand, packed sand, loose gravel, packed gravel, and rock. FIG. 2 shows the membership distributions for these classes. The terrain input can have a value from 0 to 175. This number represents the type of terrain as determined by the characterization of its coefficient of friction by the image understanding module.

There are three types of rocks defined: small, medium and large. FIG. 3 displays the membership distributions for these classes. The domain represents centimeters.

The final input is slope. There are three classes for the change in elevation between two adjacent hexes: small, medium and large. FIG. 4 displays the membership distributions for these classes. The domain represents elevation change in tenths of a meter.

The output of the fuzzy inference process of the present invention is six directional safety values for each hex representing the degree of safety for the vehicle to head in a particular direction from that hex. The directional safety has three classes: low, medium and high. FIG. 5 shows the membership distributions for these three classes. The safety value represents degree of confidence, or belief, on a scale of 0 to 100.

In order to arrive at final directional safety values for each hex, the fuzzy logic knowledge base of the present invention uses over 200 rules organized in a hierarchical structure composed of five levels. Each hex and its surrounding hexes are individually examined with respect to these five levels of rules in order to determine the six directional safety values for the center hex. The rules therefore must be applied as many times as there are hexes input to the system. All of the rules for each of the five levels are contained in Appendix A. The various levels and their functions will next be described.

Figure 6:
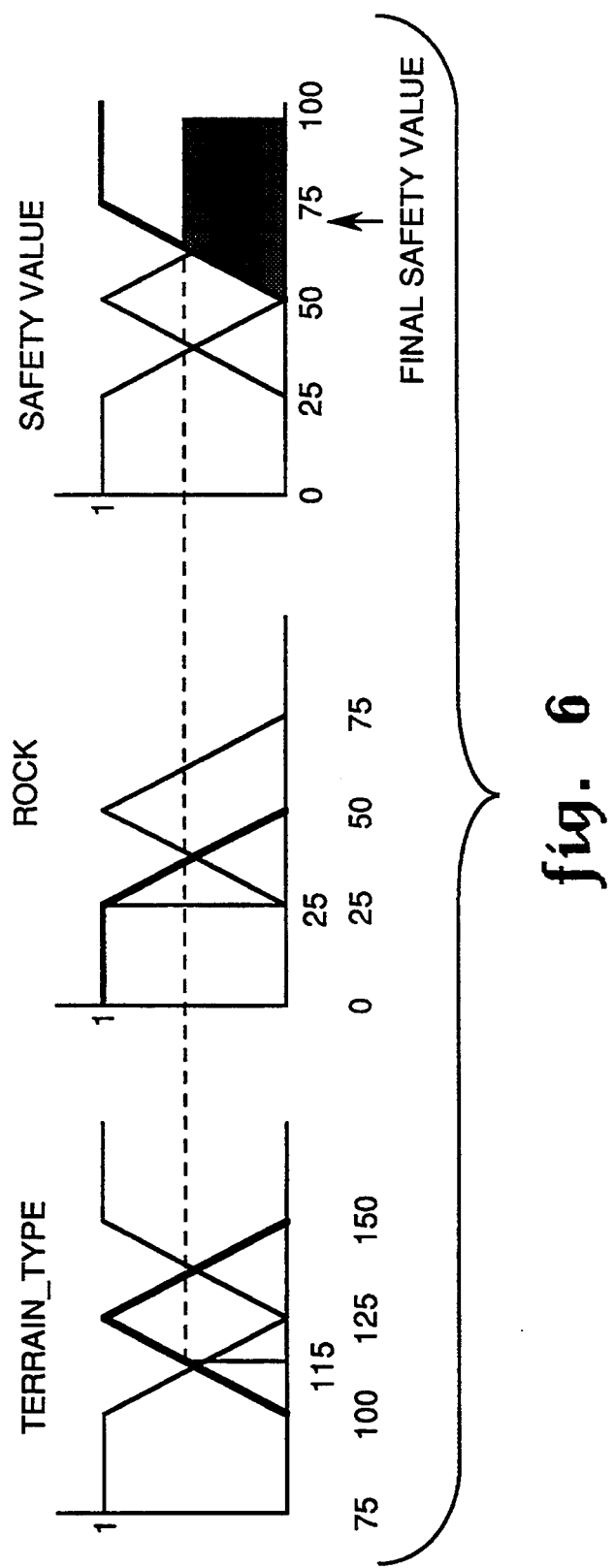
FIG. 6 shows the fuzzy inference process of the present invention.
Figure 7:
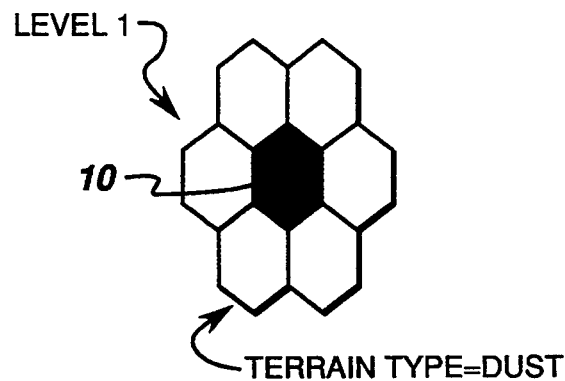
FIG. 7 depicts a level 1 evaluation in accordance with the present invention.

Level 1 determines a regional safety value for a hex and its surrounding hexes (a cluster). An example of a level one rule is:

rule packed_gravel_1_hex0_rule if terrain_type_0 is packed_gravel and rocks_0 is small then S_0_0 is high.
end The rule has two clauses in the premise. The first clause checks for the terrain type being of class packed_gravel and the second checks for rocks that are small. The degree to which that hex is safe depends on how well the two clauses match. FIG. 6 graphically shows the following example. Suppose the image understanding module characterizes the terrain to have a value of 115 for terrain type and determines that the largest rock is about 25 centimeters in diameter. The packed_gravel_1_hex0_rule rule is evaluated and computes a safety value of about 75. Since the terrain_type is only a partial match with the packed_gravel class, the output from this rule is reduced to this degree of match. This safety value is determined by calculating the centroid of the shaded area in FIG. 6. Other rules are usually evaluated and contribute to the final output. Multiple shaded areas corresponding to positive rule outputs are combined and the centroid of the combined areas becomes the output value for a safety variable. Other known output defuzzification methods besides centroid can also be used. The result of level 1 rule evaluations is a regional safety value for each hex in the cluster. In FIG. 7, if hex 10 has terrain type of dust, then it is not safe with an extremely high degree of confidence irrespective of any other features it might have.

Figure 8:
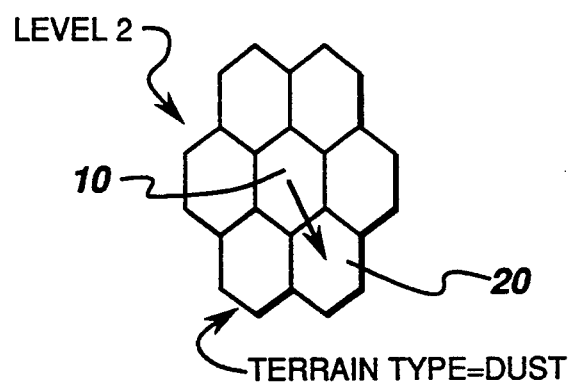
FIG. 8 depicts a level 2 evaluation in accordance with the present invention.

Level 2 computes six directional safety values for each hex. FIG. 8 shows an example of a high directional safety value. Travelling from hex 10 to hex 20 would be safe with a very high degree of confidence if the slope is low and there are no features which make either hex 10 or hex 20 unsafe.

Figure 9:
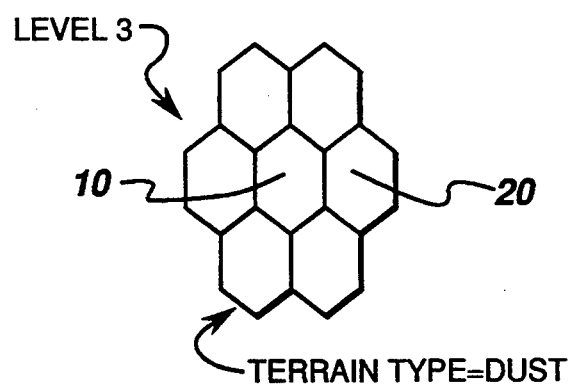
FIG. 9 depicts a level 3 evaluation in accordance with the present invention.

Level 3 examines the cross-coupling of the level 1 regional safety values between adjacent hexes. In FIG. 9, if hex 20 is not safe then hex 10 becomes less safe according to the fuzzy rules in level 3. This allows minimal clearance of one hex width from a particularly unsafe hex.

Figure 10:
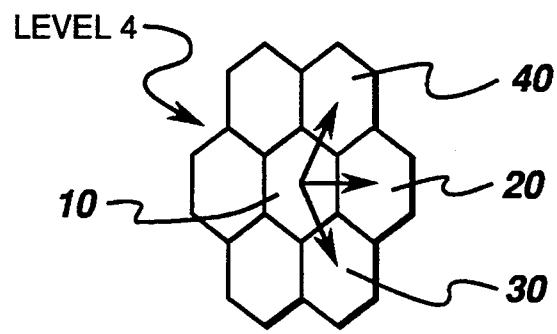
FIG. 10 depicts a level 4 evaluation in accordance with the present invention.

Level 4 examines the cross-coupling of the level 2 directional safety values. The current directional safety value becomes less safe at this level if there is an adjacent directional safety value that is not safe. In FIG. 10, if the directional safety value of travelling from hex 10 to hex 20 is low then the level 4 rules would infer that travelling from hex 10 to hex 30 or hex 40 is also unsafe.

Figure 11:
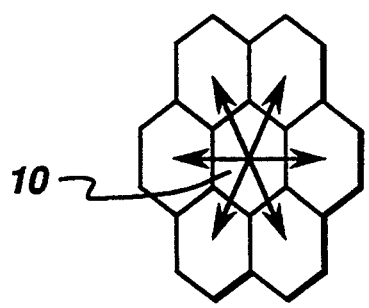
FIG. 11 depicts a level 5 evaluation in accordance with the present invention.

Level 5 examines the cross-coupling of the level 3 regional safety values with the level 4 directional safety values. At level 5 a directional safety value is determined to be unsafe if the hex's safety value is low. In FIG. 11, if the regional safety value of hex 10 is low then the directional safety of all six directions is lowered.

The directional safety values output during level 5 are the final directional safety values computed. These safety values are input to any of a number of known algorithms which can compute a "best" path which maintains a certain level of safety while minimizing the deviation from a pre-computed path based on non-local data as described earlier. An example of a simple algorithm is one based on best first search.

It should be noted that conventional logic systems could be used to achieve the results of the present invention but at a higher cost. Such systems would require a much larger number of rules. These rules might be more difficult to read and write, thus making the knowledge base more difficult to validate, debug, and maintain. Other techniques could also have been developed, however, an accurate model would be very expensive to develop. In an environment that has many unknowns, a model based approach would be more difficult to tune as the system collects data and experiences new situations. The present rule based system utilizing fuzzy logic can accommodate uncertain and incomplete data and can support self-tuning mechanisms.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

APPENDIX "A"
project navigation
hex 0 variables
symbolic representation for coefficient of traction
var terrain_type_0
type unsigned byte
  min 0
  max 175
  member dust
    points 0 1 25 1 50 0
  end
  member loose_sand
    points 25 0 50 1 75 0
  end
  member packed_sand
    points 50 0 75 1 100 0
  end
  member loose_gravel
    points 75 0 100 1 125 0
  end

```
            member packed_gravel
                points 100 0 125 1 150 0
            end
            member rock
                points 125 0 150 1 175 1
            end
        end
        /* size of rocks - values are in centimeters */
        var rocks_0
            type unsigned byte
            min 0
            max 100
            member small
                points 0 1 25 1 50 0
            end
            member medium
                points 25 0 50 1 75 0
            end
            member large
                points 50 0 75 1 100 1
            end
        end
        /* slope_values are in tenths of a meter */
        var slope_d1
            type unsigned byte
            min 0
            max 100
            member low
                points 0 1 4 1 7 0
            end
            member medium
                points 4 0 7 1 10 0
            end
            member high
                points 7 0 10 1 100 1
            end
        end
        var slope_d2
            type unsigned byte
            min 0
            max 100
            member low
                points 0 1 4 1 7 0
            end
            member medium
                points 4 0 7 1 10 0
            end
            member high
                points 7 0 10 1 100 1
            end
        end
        var slope_d3
            type unsigned byte
            min 0
            max 100
            member low
                points 0 1 4 1 7 0
            end
            member medium
                points 4 0 7 1 10 0
            end
            member high
                points 7 0 10 1 100 1
            end
        end
        var slope_d4
            type unsigned byte
            min 0
            max 100
            member low
                points 0 1 4 1 7 0
            end
            member medium
                points 4 0 7 1 10 0
            end
            member high
                points 7 0 10 1 100 1
            end
        end
        var slope_d5
            type unsigned byte
            min 0
            max 100
            member low
                points 0 1 4 1 7 0
            end
            member medium
                points 4 0 7 1 10 0
            end
            member high
                points 7 0 10 1 100 1
            end
        end
        var slope_d6
            type unsigned byte
            min 0
            max 100
            member low
                points 0 1 4 1 7 0
            end
            member medium
                points 4 0 7 1 10 0
            end
            member high
                points 7 0 10 1 100 1
            end
        end
        /* symbolic representation for safety values values are in degree
        of belief on a scale of 0 to 100 */
        var s_0_0
            type unsigned byte
            min 0
            max 100
            member low
                points 0 1 25 1 50 0
            end
            member medium
                points 25 0 50 1 75 0
            end
            member high
                points 50 0 75 1 100 1
            end
        end
        var s_0_d1
            type unsigned byte
            min 0
            max 100
            member low
                points 0 1 25 1 50 0
            end
            member medium
                points 25 0 50 1 75 0
            end
            member high
                points 50 0 75 1 100 1
            end
        end
        var s_0_d2
            type unsigned byte
            min 0
            max 100
            member low
                points 0 1 25 1 50 0
            end
            member medium
                points 25 0 50 1 75 0
            end
            member high
                points 50 0 75 1 100 1
            end
        end
        var s_0_d3
            type unsigned byte
            min 0
            max 100
            member low
                points 0 1 25 1 50 0
            end
            member medium
                points 25 0 50 1 75 0
            end
            member high
                points 50 0 75 1 100 1
            end
```

```
var s_0_d4
  type unsigned byte
  min 0
  max 100
  member low
    points 0 1 25 1 50 0
  end
  member medium
    points 25 0 50 1 75 0
  end
  member high
    points 50 0 75 1 100 1
  end
end
var s_0_d5
  type unsigned byte
  min 0
  max 100
  member low
    points 0 1 25 1 50 0
  end
  member medium
    points 25 0 50 1 75 0
  end
  member high
    points 50 0 75 1 100 1
  end
end
var s_0_d6
  type unsigned byte
  min 0
  max 100
  member low
    points 0 1 25 1 50 0
  end
  member medium
    points 25 0 50 1 75 0
  end
  member high
    points 50 0 75 1 100 1
  end
end
var ws_0
  type unsigned byte
  min 0
  max 100
  member low
    points 0 1 25 1 50 0
  end
  member medium
    points 25 0 50 1 75 0
  end
  member high
    points 50 0 75 1 100 1
  end
end
var ws_d1
  type unsigned byte
  min 0
  max 100
  member low
    points 0 1 25 1 50 0
  end
  member medium
    points 25 0 50 1 75 0
  end
  member high
    points 50 0 75 1 100 1
  end
end
var ws_d2
  type unsigned byte
  min 0
  max 100
  member low
    points 0 1 25 1 50 0
  end
  member medium
    points 25 0 50 1 75 0
  end
  member high
    points 50 0 75 1 100 1
  end
end
var ws_d3
  type unsigned byte
  min 0
  max 100
  member low
    points 0 1 25 1 50 0
  end
  member medium
    points 25 0 50 1 75 0
  end
  member high
    points 50 0 75 1 100 1
  end
end
var ws_d4
  type unsigned byte
  min 0
  max 100
  member low
    points 0 1 25 1 50 0
  end
  member medium
    points 25 0 50 1 75 0
  end
  member high
    points 50 0 75 1 100 1
  end
end
var ws_d5
  type unsigned byte
  min 0
  max 100
  member low
    points 0 1 25 1 50 0
  end
  member medium
    points 25 0 50 1 75 0
  end
  member high
    points 50 0 75 1 100 1
  end
end
var ws_d6
  type unsigned byte
  min 0
  max 100
  member low
    points 0 1 25 1 50 0
  end
  member medium
    points 25 0 50 1 75 0
  end
  member high
    points 50 0 75 1 100 1
  end
end
var fs_d1
  type unsigned byte
  min 0
  max 100
  member low
    points 0 1 25 1 50 0
  end
  member medium
    points 25 0 50 1 75 0
  end
  member high
    points 50 0 75 1 100 1
  end
end
var fs_d2
  type unsigned byte
  min 0
  max 100
  member low
    points 0 1 25 1 50 0
  end
  member medium
    points 25 0 50 1 75 0
  end
```

```
    member high
        points 50 0 75 1 100 1
    end
end
var fs_d3
    type unsigned byte
    min 0
    max 100
    member low
        points 0 1 25 1 50 0
    end
    member medium
        points 25 0 50 1 75 0
    end
    member high
        points 50 0 75 1 100 1
    end
end
var fs_d4
    type unsigned byte
    min 0
    max 100
    member low
        points 0 1 25 1 50 0
    end
    member medium
        points 25 0 50 1 75 0
    end
    member high
        points 50 0 75 1 100 1
    end
end
var fs_d5
    type unsigned byte
    min 0
    max 100
    member low
        points 0 1 25 1 50 0
    end
    member medium
        points 25 0 50 1 75 0
    end
    member high
        points 50 0 75 1 100 1
    end
end
var fs_d6
    type unsigned byte
    min 0
    max 100
    member low
        points 0 1 25 1 50 0
    end
    member medium
        points 25 0 50 1 75 0
    end
    member high
        points 50 0 75 1 100 1
    end
end
/* hex 1 variables */
/* symbolic representation for coefficient of traction */
var terrain_type_1
    type unsigned byte
    min 0
    max 175
    member dust
        points 0 1 25 1 50 0
    end
    member loose_sand
        points 25 0 50 1 75 0
    end
    member packed_sand
        points 50 0 75 1 100 0
    end
    member loose_gravel
        points 75 0 100 1 125 0
    end
    member packed_gravel
        points 100 0 125 1 150 0
    end
    member rock
        points 125 0 150 1 175 1
    end
end
/* size of rocks_values are in centimeters */
var rocks_1
    type unsigned byte
    min 0
    max 100
    member small
        points 0 1 25 1 50 0
    end
    member medium
        points 25 0 50 1 75 0
    end
    member large
        points 50 0 75 1 100 1
    end
end
/* symbolic representation for safety values values are in degree
of belief on a scale of 0 to 100 */
var s_1_0
    type unsigned byte
    min 0
    max 100
    member low
        points 0 1 25 1 50 0
    end
    member medium
        points 25 0 50 1 75 0
    end
    member high
        points 50 0 75 1 100 1
    end
end
/* hex 0 variables */
/* symbolic representation for coefficient of traction */
var terrain_type_2
    type unsigned byte
    min 0
    max 175
    member dust
        points 0 1 25 1 50 0
    end
    member loose_sand
        points 25 0 50 1 75 0
    end
    member packed_sand
        points 50 0 75 1 100 0
    end
    member loose_gravel
        points 75 0 100 1 125 0
    end
    member packed_gravel
        points 100 0 125 1 150 0
    end
    member rock
        points 125 0 150 1 175 1
    end
end
/* size of rocks - values are in centimeters */
var rocks_2
    type unsigned byte
    min 0
    max 100
    member small
        points 0 1 25 1 50 0
    end
    member medium
        points 25 0 50 1 75 0
    end
    member large
        points 50 0 75 1 100 1
    end
end
/* symbolic representation for safety values values are in degree
of belief on a scale of 0 to 100 */
var s 2 0
    type unsigned byte
    min 0
    max 100
    member low
        points 0 1 25 1 50 0
```

```
      end
      member medium
        points 25 0 50 1 75 0
      end
      member high
        points 50 0 75 1 100 1
      end
    end
    /* hex 0 variables */
    /* symbolic representation for coefficient of traction */
    var terrain_type_3
      type unsigned byte
      min 0
      max 175
      member dust
        points 0 1 25 1 50 0
      end
      member loose_sand
        points 25 0 50 1 75 0
      end
      member packed_sand
        points 50 0 75 1 100 0
      end
      member loose_gravel
        points 75 0 100 1 125 0
      end
      member packed_gravel
        points 100 0 125 1 150 0
      end
      member rock
        points 125 0 150 1 175 1
      end
    end
    /* size of rocks - values are in centimeters */
    var rocks_3
      type unsigned byte
      min 0
      max 100
      member small
        points 0 1 25 1 50 0
      end
      member medium
        points 25 0 50 1 75 0
      end
      member large
        points 50 0 75 1 100 1
      end
    end
    /* symbolic representation for safety values values are in degree
    of belief on a scale of 0 to 100 */
    var s_3_0
      type unsigned byte
      min 0
      max 100
      member low
        points 0 1 25 1 50 0
      end
      member medium
        points 25 0 50 1 75 0
      end
      member high
        points 50 0 75 1 100 1
      end
    end
    /8 hex 0 variables */
    /* symbolic representation for coefficient of traction */
    var terrain_type_4
      type unsigned byte
      min 0
      max 175
      member dust
        points 0 1 25 1 50 0
      end
      member loose_sand
        points 25 0 50 1 75 0
      end
      member packed_sand
        points 50 0 75 1 100 0
      end
      member loose_gravel
        points 75 0 100 1 125 0
      end
      member packed_gravel
        points 100 0 125 1 150 0
      end
      member rock
        points 125 0 150 1 175 1
      end
    end
    /* size of rocks - values are in centimeters */
    var rocks_4
      type unsigned byte
      min 0
      max 100
      member small
        points 0 1 25 1 50 0
      end
      member medium
        points 25 0 50 1 75 0
      end
      member large
        points 50 0 75 1 100 1
      end
    end
    /* symbolic representation for safety values values are in degree
    of belief on a scale of 0 to 100 *.
    var s_4_0
      type unsigned byte
      min 0
      max 100
      member low
        points 0 1 25 1 50 0
      end
      member medium
        points 25 0 50 1 75 0
      end
      member high
        points 50 0 75 1 100 1
      end
    end
    /* hex 0 variables */
    /* symbolic representation for coefficient of traction */
    var terrain_type_5
      type unsigned byte
      min 0
      max 175
      member dust
        points 0 1 25 1 50 0
      end
      member loose_sand
        points 25 0 50 1 75 0
      end
      member packed_sand
        points 50 0 75 1 100 0
      end
      member loose_gravel
        points 75 0 100 1 125 0
      end
      member packed_gravel
        points 100 0 125 1 150 0
      end
      member rock
        points 125 0 150 1 175 1
      end
    end
    /* size of rocks - values are in centimeters */
    var rocks_5
      type unsigned byte
      min 0
      max 100
      member small
        points 0 1 25 1 50 0
      end
      member medium
        points 25 0 50 1 75 0
      end
      member large
        points 50 0 75 1 100 1
      end
    end
    /* symbolic representation for safety values values are in degree
    of belief on a scale of 0 to 100 */
    var s_5_0
      type unsigned byte
```

```
            min 0
            max 100
            member low
                points 0 1 25 1 50 0
            end
            member medium
                points 25 0 50 1 75 0
            end
            member high
                points 50 0 75 1 100 1
            end
        end
        /* hex 0 variables */
        /* symbolic representation for coefficient of traction */
        var terrain_type_6
            type unsigned byte
            min 0
            max 175
            member dust
                points 0 1 25 1 50 0
            end
            member loose sand
                points 25 0 50 1 75 0
            end
            member packed_sand
                points 50 0 75 1 100 0
            end
            member loose_gravel
                points 75 0 100 1 125 0
            end
            member packed_gravel
                points 100 0 125 1 150 0
            end
            member rock
                points 125 0 150 1 175 1
            end
        end
        /* size of rocks - values are in centimeters */
        var rocks_6
            type unsigned byte
            min 0
            max 100
            member small
                points 0 1 25 1 50 0
            end
            member medium
                points 25 0 50 1_75 0
            end
            member large
                points 50 0 75 1 100 1
            end
        end
        /* symbolic representation for safety values values are in degree
            of belief on a scale of 0 to 100 */
        var s_6_0
            type unsigned byte
            min 0
            max 100
            member low
                points 0 1 25 1 50 0
            end
            member medium
                points 25 0 50 1 75 0
            end
            member high
                points 50 0 75 1 100 1
            end
        end
    fuzzy level_1_rules
        /* hex 0 */
        rule dust hex0_rule
            if terrain_type_0 is dust then
                s_0_0 is low
        end
        rule large_rock_hex0_rule
            if rocks_0 is large then
                s_0_0 is low
        end
        rule loose_sand_1_hex0_rule
            if terrain_type_0 is loose_sand and rocks_0 is small then
                s_0_0 is medium
        end
        rule loose_sand_2_hex0_rule
            if terrain_type_0 is loose_sand and rocks_0 is medium then
                s_d_0 is low
        end
        rule packed_sand_1_hex0_rule
            if terrain_type_0 is packed_sand and rocks_0 is small then
                s_d_0 is medium
        end
        rule packed_sand_2_hex0_rule
            if terrain_type_0 is packed_sand and rocks_0 is medium then
                s_0_0 is medium
        end
        rule loose_gravel_1_hex0_rule
            if terrain_type_0 is loose_gravel and rocks_0 is small then
                s_0_6_0 is high
        end
        rule loose_gravel_2_hex0_rule
            if terrain_type_0_type_6 is loose gravel
                and rocks_0 is medium then
                s_6_0 is medium
        end
        rule packed_gravel_1_hex0_rule
            if terrain_type_0 is packed_gravel and rocks_0 is small then
                s_0_0 is high
        end
        rule packed_gravel_2_hex0_rule
            if terrain_type_0 is packed_gravel and rocks_0 is medium
                then
                s_6_0 is high
        end
        rule rock_1_hex0_rule
            if terrain_type_0 is rock and rocks_0 is small then
                s_6_0 is high
        end
        rule rock_2_hex0_rule
            if terrain_type_0 is rock and rocks_0 is medium then
                s_0_0 is high
        end
        /* hex 1 */
        rule dust_hex1_rule
            if terrain_type_1 is dust then
                s_f_0 is low
        end
        rule large_rock hex1_rule
            if rock_s_1 is large then
                s_1_0 is low
        end
        rule loose_sand_1_hex1_rule
            if terrain_type_1 is loose_sand and rocks_1 is small then
                s_1_0 is medium
        end
        rule loose sand_2_hex1_rule
            if terrain_type_1 is loose_sand and rocks_1 is medium then
                s_1_0 is low
        rule packed_sand_1_hex1_rule
            if terrain_type_1 is packed_sand and rocks_1 is small then
                s_1_0 is medium
        rule packed_sand_2_hex1_rule
            if terrain_type_1 is packed_sand and rocks_1 is medium then
                s_1_0 is medium
        rule loose_gravel_1_hex1_rule
            if terrain_type_1 is loose_gravel and rocks_1 is small then
                s_1_0 is high
        rule loose_gravel_2_hex1_rule
            if terrain_type_1 is packed_gravel and rocks_1 is medium
                then
                s_1_0 is medium
        rule packed_gravel_1_hex1_rule
            if terrain_type_1 is packed_gravel and rocks_1 is small then
                s_1_0 is high
        rule packed_gravel_2_hex1_rule
            if terrain_type_1 is packed_gravel and rocks_1 is medium
                then
                s_1_0 is high
        rule rock_1_hex1_rule
            if_terrain_type_1 is rock and rocks_1 is small then
                s_1_0 is high
        rule rock_2_hex1_rule
            if terrain_type_1 is rock and rocks_1 is medium then
                s_i_0 is high
        rule dust_hex2_rule
            if terrain_type_2 is dust then
```

```
            s__2__0 is low
    rule large__rock__hex2__rule
        if rocks__2 is large then
            s__2__0 is low
    rule loose__sand__1__hex2__rule
        if terrain_type__2 is loose__sand and rocks__2 is small then
            s__2__0 is medium
    rule loose__sand__2__hex2__rule
        if terrain_type__2 is loose__sand and rocks__2 is medium then
            s__2__0 is low
    rule packed__sand__1__hex2__rule
        if terrain_type__2 is packed__sand and rocks__2 is small then
            s__2__0 is medium
    rule packed sand__2__hex2__rule
        if_terrain_type__2 is packed__sand and
            rocks__2 is medium then
            s__i__0 is medium
    rule loose__gravel__1__hex2__rule
        if terrain___type__f is loose__gravel and
            rocks__2 is small then
            s__f__0 is high
    rule loose__gravel__2__hex2__rule
        if terrain_type__i is loose__gravel and rocks 2 is medium then
            s__2__0 is medium
    rule packed__gravel__1__hex2__rule
        if terrain_type__2 is packed__gravel and rocks__2 is small then
            s__2__0 is high
    rule packed__gravel__2__hex2__rule
        if terrain_type__2 is packed__gravel and rocks__2 is medium
            then
            s__2__0 is high
    rule rock__1__hex2__rule
        if terrain_type__2 is rock and rocks__2 is small then
            s__2__0 is high
    rule rock__2__hex2__rule
        if terrain_type__2 is rock and rocks__2 is medium then
            s__2__0 is high
/* hex 3 */
    rule dust__hex3__rule
        if terrain_type__3 is dust then
            s__1__0 is low
    rule large__rock__hex3__rule
        if rocks__3 is large then
            s__3__0 is low
    rule loose__sand__1__hex3__rule
        if terrain type__3 is loose__sand and rocks 3 is small then
            s__3__0 is medium
    rule loose__sand__2__hex3__rule
        if terrain type 3 is loose__sand and rocks 3 is medium then
            s__3__0 is low
    rule packed__sand__1__hex3__rule
        if terrain type__3 is packed sand and rocks 3 is small then
            s__3__0 is medium
    rule packed__sand__2__hex3__rule
        if terrain_type__3 is packed__sand and rocks__3 is medium then
            s__3__0 is medium
    end
    rule loose__gravel__1__hex3__rule
        if terrain_type__i is loose__gravel and rocks__3 is
            small then
            s__3__0 is high
    end
    rule loose__gravel__2__hex3__rule
        if terrain_type__i is loose__gravel and rocks__3 is medium then
            s__3__0 is medium
    end
    rule packed__gravel__1__hex3__rule
        if terrain_type__3 is packed__gravel and rocks__3 is small then
            s__3__0 is high
    end
    rule packed__gravel__2__hex3__rule
        if terrain type__3 is packed__gravel and rocks__3 is medium
            then
            s__3__0 is high
    end
    rule rock__1__hex3__rule
        if_terrain_type__3 is rock and rocks__3 is small then
            s__3__0 is high
    end
    rule rock__2__hex3__rule
        if_terrain_type__3 is rock and rocks__3 is medium then
            s__3__0 is high
    end
/* hex 4 */
    rule dust__hex4__rule
        if terrain_type__4 is dust then
            s__4__0 is low
    end
    rule large__rock__hex4__rule
        if rocks__4 is large then
            s__4__0 is low
    end
    rule loose__sand__1__hex4__rule
        if terrain_type__4 is loose__sand and rocks__4 is small then
            s__4__0 is medium
    end
    rule loose__sand__2__hex4__rule
        if terrain_type__4 is loose__sand and rocks__4 is medium then
            s__4__0 is low
    end
    rule packed__sand__1__hex4__rule
        if terrain_type__4 is packed__sand and rocks__4 is small then
            s__4__0 is medium
    end
    rule packed__sand__2__hex4__rule
        if terrain_type__4 is packed__sand and rocks__4 is medium then
            s__4__0 is medium
    end
    rule loose__gravel__1__hex4__rule
        if terrain___type__4 is loose__gravel and rocks__4 is
            small then
            s__4__0 is high
    rule loose__gravel__2__hex4__rule
        if terrain_type__4 is loose__gravel and rocks__4 is medium then
            s__4__0 is medium
    rule packed__gravel__1__hex4__rule
        if terrain_type__4 is packed__gravel and rocks__4 is small then
            s__4__0 is high
    rule packed__gravel__2__hex4__rule
        if terrain_type__4 is packed__gravel and rocks__4 is medium
            then
            s__4__0 is high
    rule rock__1__hex4__rule
        if terrain_type__4 is rock and rocks__4 is small then
            s__4__0 is high
    rule rock__2__hex4__rule
        if terrain_type__4 is rock and rocks__4 is medium then
            s__4__0 is high
/* hex 5 */
    rule dust__hex5__rule
        if terrain_type__5 is dust then
            s__5__0 is low
    rule large__rock__hex5__rule
        if rocks__5 is large then
            s__5__0 is low
    rule loose__sand__1__hex5__rule
        if terrain_type__5 is loose__sand and rocks__5 is small then
            s__5__0 is medium
    rule loose__sand__2__hex5__rule
        if terrain type__5 is loose__sand and rocks__5 is medium then
            s__5__0 is low
    rule packed__sand__1__hex5__rule
        if terrain_type__5 is packed__sand and rocks__5 is small then
            s__9__0 is medium
    rule packed sand__2 hex5__rule
        if terrain_type__5 is packed__sand and rocks__5 is medium then
            s__5__0 is medium
    rule loose__gravel__1__hex5__rule
        if terrain_type__B is loose__gravel and rocks__5 is small then
            s__5__0 is high
    rule loose__gravel__2__hex5__rule
        if terrain_type__5 is loose__gravel and rocks__5 is medium then
            s__5__0 is medium
    rule packed__gravel__1__hex5__rule
        if terrain type__5 is packed__gravel and rocks__5 is small then
            s__5__0 is high
    rule packed__gravel__2__hex5__rule
        if terrain_type__5 is packed__gravel and rocks__5 is medium
            then
            s__5__0 is high
    rule rock__E1__hex5__rule
        if terrain_type__5 is rock and rocks__5 is small then
            s__5__0 is high
    end
```

```
rule rock_2_hex5_rule
    if terrain_type_5 is rock and rocks_5 is medium then
        s_5_0 is high
    end
/* hex 6 */
    rule dust_hex6_rule
        if terrain_type_6 is dust then
            s_6_0 is low
        end
    rule large_rock_hex6_rule
        if rocks_6 is large then
            s_6_0 is low
        end
    rule loose_end_sand_1_hex6_rule
        if terrain type_6 is loose sand and rocks_6 is small then
            s_6_0 is medium
        end
    rule loose_sand_2_hex6_rule
        if terrain_type_6 is loose_sand and rocks_6 is medium then
            s_6_0 is low
        end
    rule packed_sand_1_hex6_rule
        if terrain_type_6 is packed_sand and rocks_6 is small then
            s_6_0 is medium
        end
    rule packed_sand_2_hex6_rule
        if terrain_type_6 is packed_sand and rocks_6 is medium then
            s_6_0 is medium
        end
    rule loose_gravel_1_hex6_rule
        if terrain_type_6 is loose_gravel and rocks_6 is small then
            s_6_0 is high
        end
    rule loose_gravel_2_hex6_rule
        if terrain_type_6 is loose_gravel and rocks_6 is medium then
            s_6_0 is medium
        end
    rule packed_gravel_1_hex6_rule
        if terrain_type_6 is packed_gravel and rocks_6 is small then
            s_6_0 is high
        end
    rule packed_gravel_2_hex6_rule
        if terrain_type_6 is packed_gravel and rocks_6 is medium then
            s_6_0 is high
        end
    rule rock_1 hex6_rule
        if terrain_type_6 is rock and rocks_6 is small then
            s_6_0 is high
        end
    rule rock_2_hex6_rule
        if terrain_type_6 is rock and rocks_6 is medium then
            s_9_0 is high
        end
end /* level_1_rules */
fuzzy level_2_rules
/* directional safety: d1 */
    rule any_slope_d1_rule
        if s_0_0 is low or s_1_0 is low then
            s_0_d1 is low
        end
    rule low_slope_1_d1_rule
        if slope_d1 is low and s_0_0 is medium and s_1_0 is
            medium then
            s_0_d1 is medium
        end
    rule low_slope_2_d1_rule
        if slope_d1 is low and s_0_0 is medium and s_1_0 is
            high then
            s_0_d1 is high
        end
    rule low_slope_3_d1_rule
        if slope_d1 is low and s_0_0 is high and s_1_0 is
            medium then
            s_0_d1 is medium
        end
    rule low_slope_4_d1_rule
        if slope_d1 is low and s_0_0 is high and s_1_0 is
            high then
            s_0_d1 is high
        end
    rule medium_slope_1_d1_rule
        if slope_d1 is medium and s_0_0 is medium and
            s_1_0 is medium then
            s_0_d1 is medium
        end
    rule medium_slope_2_d1_rule
        if slope_d1 is medium and s_0_0 is medium and
            s_1_0 is high then
            s_0_d1 is medium
        end
    rule medium_slope_3_d1_ruie
        if slope_d1 is medium and s_0_0 is high and
            s_1_0 is medium then
            s_0_d1 is medium
        end
    rule medium_slope_4_d1_rule
        if slope_d1 is medium and s_0_0 is high and s_1_0 is high
            then
            s_0_d1 is high
        end
    rule high_slope_d1_rule
        if slope_d1 is high then
            s_0_d1 is low
        end
/* directional safety: d2 */
    rule any_slope_d2  rule
        if s_0_0 is low or s_2_0 is low then
            s_0_d2 is low
        end
    rule low_slope_1_d2_rule
        if slope_d2 is low and s_0_0 is medium and s_2_0 is
            medium then
            s_0_d2 is medium
        end
    rule low_slope_2_d2_rule
        if slope_d2 is low and s_0_0 is medium and s_2_0 is
            high then
            s_0_d2 is high
        end
    rule low_slope_3_d2_rule
        if slope_d2 is low and s_0_0 is high and s_2_0 is
            medium then
            s_0_d2 is medium
        end
    rule low_slope_4_d2_rule
        if slope_d2 is low and s_0_0 is high and s_2_0 is
            high then
            s_0_d2 is high
        end
    rule medium_slope_1_d2_rule
        if slope_d2 is medium and s _00 is medium and
            s_2_0 is medium then
            s_0_d2 is medium
        end
    rule medium_slope_2_d2_rule
        if slope_d2 is medium and s_0_0 is medium and
            s_2 0 is high then
            s_0_d2 is medium
        end
    rule medium_slope_3_d2_rule
        if slope_d2 is medium and s _0_0 is high and
            s_2_0 is medium then
            s_0_d2 is medium
        end
    rule medium_slope_4_d2_rule
        if slope_d2 is medium and s_0_0 is high and s_2_0 is high
            then
            s_0_d2 is high
        end
    rule high_slope_d2_rule
        if slope_d2 is high then
            s_0_d2 is low
        end
/* directional safety: d3 */
    rule any slope d3  rule
        if s 0 0 is low or s_3_0 is low then
            s_0_j3_is low
        end
    rule low_slope_1_d3_rule
        if slope_d3 is low and s _0_0 is medium and s_3_0 is
            medium then
            s_0_d3 is medium
        end
    rule low slope2_d3_rule
```

```
    if slope_d3 is low and s_0_0 is medium and s_3_0 is
      high then
        s_0_d3 is high
end
rule low_slope_3_d3_rule
    if slope_d3 is low and s _0_0 is high and s_3_0 is
      medium then
        s_0_d3 is medium
end
rule low_slope_4_d3_rule
    if slope_d3 is low and s _0_0 is high and s_3_0 is
      high then
        s_0_d3 is high
end
rule medium_slope_1_d3_rule
    if slope_d3 is medium and s_0_0 is medium and
      s_3_0 is medium then
        s_0_d3 is medium
end
rule medium_slope_2_d3_rule
    if slope_d3 is medium and s_00 is medium and
      s_3_0 is high then
        s_0_d3 is medium
end
rule medium_slope_3_d3_rule
    if slope_d3 is medium and s_00 is high and
      s_3_0 is medium then
        s_0_d3 is medium
end
rule medium_slope_4_d3_rule
    if slope_d3 is medium and s_0_0 is high and s_3_0 is high
      then
        s_0_d3 is high
end
rule high_slope_d3_rule
    if slope_d3 is high then
        s_0_d3 is low
end
/* directional safety: d4 */
rule any_slope_d4_rule
    if s_0_0 is low or s_4_0 is iow then
        s_0_d4 is low
end
rule low_slope_1_d4_rule
    if slope_d4 is low and s_0_0 is medium and s_4_0 is
      medium then
        s_0_d4 is medium
end
rule low_slope_2_d4_rule
    if slope_d4 is low and s_0_0 is medium and s_4_0 is
      high then
        s_0_d4 is high
end
rule low_slope3_d4_ rule
    if slope_d4 is low and s 0_0 is high and s_4_0 is medium then
        s_0_d4 is medium
end
rule low_slope_4_d4_rule
    if slope_d4 is low and s_0_0 is high and s_4_0 is
      high then
        s_0_d4 is high
end
rule medium_slope_1_d4_rule
    if slope_d4 is medium and s _0_0 is medium and
      s_4_0 is medium then
        s_0_d4 is medium
end
rule medium_slope_2_d4_rule
    if slope_d4 is medium and s_0_0 is medium and
      s_4_0 is high then
        s_0_d4 is medium
end
rule medium_slope_3_d4_rule
    if slope_d4 is medium and s_0_0 is high and
      s_4_0 is medium then
        s_0_d4 is medium
end
rule medium_slope_4_d4_rule
    if slope_d4 is medium and s_0_0 is high and s_4_0 is high
      then
        s_0_d4 is high
end
rule high_slope_d4_ rule
    if slope_d4 is high then
        s_0_d4 is low
end
/* directional safety: d5 */
rule any_slope_d5_rule
    if s_0_0 is low or s_5_0 is low then
        s_0_d5 is low
end
rule low_slopel_d5_rule
    if slope_d5 is low and s_0_0 is medium and s_1_0 is
      medium then
        s_0_d5 is medium
end
rule low_slope_2_d5_rule
    if slope_d5 is low and s _0_0 is medium and s_1_0 is
      high then
        s_0_d5 is high
end
rule low_slope3_d5_rule
    if slope_d5 is low and s_0_0 is high and s_1_0 is
      medium then
        s_0_d5 is medium
end
rule low_slope_4_d5_ rule
    if slope_d5 is low and s_0_0 is high and s_1_0 is
      high then
        s_0_d5 is high
end
rule medium_slope_1_d5_rule
    if slope_d5 is medium and s_0_0 is medium and
      s_0 is medium then
        s_0_d5 is medium
end
rule medium_slope_2_d5_rule
    if slope_d5 is medium and s_0 0 is medium and
      s_1_0 is high then
        s_0_d5 is medium
end
rule medium_slope_3_d5_rule
    if slope_d5 is medium and s 0 0 is high and
      s_0 is medium then
        s_0_d5 is medium
end
rule medium_slope_4_d5_rule
    if slope_d5 is medium and s_0_0 is high and s_1_0 is high
      then
        s_0_d5 is high
end
rule high_slope_d5_rule
    if slope_d5 is high then
        s_0_d5 is low
end
/* directional safety: d6 */
rule any_slope_d6_rule
    if s_0_0 is low or s_6_0 is low then
        s_0_d6 is low
end
rule low_slope_1_d6_ rule
    if slope_d6 is low and s _0_0 is medium and s_6_0 is
      medium then
        s_0_d6 is medium
end
rule low_slope_2_d6_ rule
    if slope_d6 is low and s _0_0 is medium and s_6_0 is
      high then
        s_0_d6 is high
end
rule low_slope_3_d6_ rule
    if slope_d6 is low and s _0_0 is high and s_6_0 is
      medium then
        s_0_d6 is medium
end
rule low_slope_4_d6_rule
    if slope_d6 is low and s_0_0 is high and s_6_0 is
      high then
        s—0_d6 is high
rule medium_slope_1_d6_rule
    if slope_d6 is medium and s_0_0 is medium and
      s_6_0 is medium then
        s—0_d6 is medium
rule medium_slope_2_d6_rule
```

```
        if slope_d6 is medium and s 0_0 is medium and
            s_6_0 is high then
            s_0_d6 is medium
    rule medium - slope_3_d6_rule
        if slope_d6 is medium and s_0_0 is high and
            s_6_0 is medium then
            s_0_d6 is medium
    rule medium_slope_4_d6_rule
        if slope_d6 is medium and s-0-0 is high and s-6-0 is high
            then
            s_0_d6 is high
    rule high_slope_d6_rule
        if slope_d6 is high then
            s_0_d6 is low
    end
end /* level_2_rules
fuzzy level_3_rules
    rule any_low_ws_0_rule
        if s_0_1 is low or s_1_0 is low
            or s_2_0 is low or
            s_3_0 is low or s_4_0 is low
            or s_5_0 is low or
            s_6_0 is low then
            ws_0 is low
    rule medium ws_0_rule
        if s_0_0 is medium and
            s_1_0 is not low and
            s_2_0 is not low and
            s_3_0 is not low and
            s_4_0 is not low and
            s_5_0 is not low and
            s_6_0 is not low then
            ws_0 is medium
    rule medium_high_ws_0_rule
        if s_0_0 is high and
            s_1_0 is not low and
            s_2_0 is not low and
            s_3_0 is not low and
            s_4_0 is not low and
            s_5_0 is not low and
            s_6_0 is not low then
            ws_0 is high
    rule all_high_ws_0_rule
        if s_0_0 is high and s_1_0 is high and s_2_0 is
            high and
            s_3_0 is high and s_4_is high and s_5_0 is
            high and
            s_6_0 is high then
            ws_0 is high
    end
end /* level_3_rules
fuzzy level_4_rules
/* d1 */
    rule any_low_ws_d1_rule
        if s_0_d6 is low or s_0_d1 is low or s_0_d2 is
            low then
            ws_d1 is low
    end
    rule medium_high_1_ws_d1_rule
        if s_0_d6 is medium and
            (s_0_d1 is medium or s_0_d1 is high) and
            (s_0_d2 is medium or s_0_d2 is high) then
            ws_d1 is medium
    end
    rule medium_high_2_ws_d1_rule
        if (s_0_d6 is medium or s_0_d6 is high) and
            s_0d1 is medium and
            (s_0_d2 is medium or s_0_d2 is high) then
            ws_d1 is medium
    end
    rule medium_high_3_ws_d1  rule
        if (s_0_d6 is medium or s_0_d6 is high) and
            (s_0_d1 is medium or s_0_d1 is high) and
            s_6_d2 is medium then
            ws_d1 is medium
    end
    rule all_high_ws_d1_rule
        if s_0_d6 is high and s_0_d1 is high and s_0_d2 is high then
            ws_d1 is high
    end
/* d2 */
    rule any_low_ws_d2_rule
        if s_0_1 is low or s_0_d2 is low or s_0_d3 is low then
            ws_d2 _1s low
    end
    rule medium_high_1_ws_d2    rule
        if s_0_d1 is medium and
            (s_0d2 is medium or s_0_d2 is high) and
            (s_0d3 is medium or s_0_d3 is high) then
            ws_d2 is medium
    end
    rule medium_high_2_ws_d2    rule
        if (s_0_d1 is medium or s_0_d1 is high) and
            s_0_d2 is medium and
            (s_0_d3 is medium or s_0_d3 is high) then
            ws_d2 is medium
    end
    rule medium_high_3_ws_d2-   rule
        if s_0_d1 is medium or s_0_d1 is hiah) and
            (s_0_d2 is medium or s_0_d2 is high) and
            s_0_d3 is medium then
            ws_d2 is medium
    end
    rule all_high ws_d2_rule
        if s_0_d1 is high and s_0_d2 is high and
            s_0_d3 is high then
            ws_d2 is high
    end
/* d3 */
    rule any_low_ws_d3_rule
        if s_0_d2 is low or s_0_d3 is low or s_0_d4 is
            low then
            ws_d3 is low
    end
    rule medium_high_1_ws_d3_rule
        if s_0_d2 is medium and
            (s_0_d3 is medium or s _0_d3 is high) and
            (s_0_d4 is medium or s_0_d4 is high) then
            ws_d3 is medium
    end
    rule medium_high_2_ws_d3_rule
        if (s_0_d2 is medium or s_0_d2 is high) and
            s_0_d3 is medium and
            (s_j_d4 is medium or s_0_d4 is high) then
            ws_d3 is medium
    end
    rule medium_high_3_ws_d3_rule
        if (s_0_d2 is medium or s_0_d2 is high) and
            (s_0_d3 is medium or s_0_d3 is high) and
            s_0_d4 is medium then
            ws_d3 is medium
    end
    rule all_high_ws_d3_rule
        if s_0_d2 is high and s_0_d3 is high and s_0_d4 is
            high then
            ws_d3 _is high
    end
/* d4 */
    rule any_low_ws_d4_rule
        if s_0_d3 is low or s_0_d4 is low or s_0_d5 is
            low then
            ws_d4 is low
    end
    rule medium_high_1_ws_d4_rule
        if s_0_d3 is medium and
            (s_0_d4 is medium or s _0_d4 is high) and
            (s_0_dS is medium or s_0_d5 is high) then
            ws_d4 is medium
    end
    rule medium_high_2_ws_d4_rule
        if (s_0_d3 is medium or s_0_d3 is high) and
            s_0_d4 is medium and
            (s_0_d5 is medium or s_0_d5 is high) then
            ws_d4 is medium
    end
    rule medium_high_3_ws_d4   rule
        if (s_0_d3 is medium or s_0_d3 is high) and
            (s_0_d4 is medium or s_0_d4 is high) and
            s_0_dS is medium then
            ws_d4 is medium
    end
    rule all_high_ws_d4_rule
        if s_0_d3 is high and s_0_d4 is high and
            s_0_d5 is high then
```

```
        ws_d4 is high
    end
/* d5 */
    rule any_low_ws_d5_rule
        if s_0_d4 is low or s_0_d5 is low or s_0_d6
        is low then
            ws_d5 is low
    end
    rule medium_high_1_ws_d5_rule
        if s_0_d4 is medium and
            (s_0_d5 is medium or s_0_d5 is high) and
            (s_0_d6 is medium or s_0_d6 is high) then
            ws_d5 is medium
    end
    rule medium_high_2_ws_d5_rule
        if (s_0_d4 is medium or s_0_d4 is high) and
            s_0_d5 is medium and
            (s_0_d6 is medium or s_0_d6 is high) then
            ws_d5 is medium
    end
    rule medium high_3_ws_d5_rule
        if (s_0_d4 is medium or s_0_d4 is high) and
            (s_0_d5 is medium or s_0_d5 is high) and
            s_6_d6 is medium then
            ws_d5 is medium
    end
    rule all_high_ws_d5_rule
        if s_0_d4 is high and s_0_d5 is high and s_0_d6
        is high then
            ws_d5 is high
    end
/* d6 */
    rule any_low_ws_d6_rule
        if s_0_d5 is low or s_0_d6 is low or s_0_d1 is
        low then
            ws_d76 _is low
    end
    rule medium_high_1_ws_d6_rule
        if s_0_d5 is medium and
            (s_0_d6 is medium or s_0_d6 is high) and
            (s_0_d1 is medium or s_0_d1 is high) then
            ws_d6 is medium
    end
    rule medium_high_2_ws_d6_rule
        if (s_0_d5 is medium or s_0_d5 is high) and
            s_0_d6 is medium and
            (s_0_d1 is medium or s_0_d1 is high) then
            ws_d6 is medium
    end
    rule medium_high_3_ws_d6_rule
        if (s_0_d5 is medium or s_0_5 is high) and
            (s_0_d6 is medium or s_0_d6 is high) and
            s_6_d1 is medium then
            ws_d6 is medium
    end
    rule all_high_ws_d6_rule
        if s_6_d5 is high and s_0_d6 is high and s_0_d1
        is high then
            ws_d76 _is high
    end
end
fuzzy level_5_rules
/* d1 */
    rule any_low_fs_1_rule
        if ws_0 is low or ws_d1 is low then
            fs_d1 is low
    end
    rule medium_high_1_fs_1_rule
        if ws_0 is medium and (ws_d1 is medium or ws_d1 is high)
        then
            fs_d1 is medium
    end
    rule medium_high_2_fs_1  rule
        if (ws_0 is medium or ws_0 is high) and ws_d1 is medium
        then
            fs_d1 is medium
    end
    rule all_high_fs_1_rule
        if ws_0 is high and ws_d1 is high then
            fs_d1 is high
    end
/* d2 */
    rule any_low_fs_2_rule
        if ws_0 is low or ws_d2 is low then
            fs_d2 is low
    end
    rule medium_high_1_fs_2_rule
        if ws_0 is medium and (ws_d2 is medium or ws_d2 is high)
        then
            fs_d2 is medium
    end
    rule medium_high_2_fs_2   rule
        if (ws_0 is medium or ws_0 is high) and ws_d2 is medium
        then
            fs_d2 is medium
    end
    rule all_high_fs_2_rule
        if ws_0 is high and ws_d2 is high then
            fs_d2 is high
    end
/* d3 */
    rule any_low_fs_3_rule
        if ws_0 is low or ws_d3 is low then
            fs_d3 is low
    end
    rule medium_high_1_fs_3_rule
        if ws _0 is medium and (ws_d3 is medium or ws_d3 is high)
        then
            fs_d3 is medium
    end
    rule medium_high_2_fs_3_rule
        if (ws _0 is medium or ws_0 is high) and ws_d3 is medium
        then
            fs_d3 is medium
    end
    rule all_high_fs_3_rule
        if ws_0 is high and ws_d3 is high then
            fs_d3 is high
    end
/* d4 */
    rule any_low_fs_4_rule
        if ws _0 is low or ws_d4 is low then
            fs_d4 is low
    end
    rule medium_high_1_fs_4_rule
        if ws_0 is medium and (ws_d4 is medium or ws_d4 is high)
        then
            fs_d4 is medium
    end
    rule medium_high_2_fs_4_rule
        if (ws _0 is medi7um or ws_0 is high) and ws_d4 is medium
        then
            fs_d4 is medium
    end
    rule all high_fs_4_rule
        if ws_0 is high and ws_d4 is high then
            fs_d4 is high
    end
/* d5 */
    rule any_low_fs_5_rule
        if ws _0 is low or ws_d5 is low then
            fs_d5 is low
    end
    rule medium_high_1_fs_5_rule
        if ws_0 is medium and (ws_d5 is medium or ws_d5 is high)
        then
            fs_d5 is medium
    end
    rule medium_high_2_fs_5_rule
        if (ws _0 is medium or ws_0 is high) and ws_d5 is medium
        then
            fs_d5 is medium
    end
    rule all high_fs_5_rule
        if ws_0 is high and ws_d5 is high then
            fs_d5 is high
    end
/* d6 */
    rule any_low_fs_6  rule
        if ws_0 is low or ws_d6 is low then
            fs_d6 is low
    end
    rule medium_high_1_fs_6-  rule
        if ws_0 is medium and (ws_d6 is medium or ws_d6 is high)
```

```
        then
            fs_d6 is medium
        end
    rule medium_high_2_fs_6  rule
        if (ws _0 is medium or ws_0 is high) and ws_d6 is medium
        then
            fs_d6 is medium
        end
    rule all high_fs_6  rule
        if ws_0 is high and ws_de is high then
            fs_d6 is high
        end
    end /* level_5_rules
/* level 1 rule connections */
/* hex 0 */
    connect
        from terrain_type_0
        to level_1_rules
    end
    connect
        from rocks_0
        to level_1_rules
    end
    connect
        from level_1_rules
        to s_0_0
    end
/* hex 1 */
    connect
        from terrain_type_1
        to level_1_rules
    end
    connect
        from rocks_1
        to level_1_rules
    end
    connect
        from level_1_rules
        to s_1_0
    end
/* hex 2 */
    connect
        from terrain_type_2
        to level_1_rules
    end
    connect
        from rocks_2
        to level_1_rules
    end
    connect
        from level_1_rules
        to s_2_0
    end
/* hex 3 */
    connect
        from terrain_type_3
        to level_1_rules
    end
    connect
        from rock3
        to level_1_ruies
    end
    connect
        from level_1_rules
        to s_3_0
    end
/* hex 4 */
    connect
        from terrain_type_4
        to level_1_rules
    end
    connect
        from rocks_4
        to level_1_rules
    end
    connect
        from level_1_rules
        to s_4_0
    end
/* hex 5 */
    connect
        from terrain_type_5
        to level_1_rules
    end
    connect
        from rocks_5
        to level_1_rules
    end
    connect
        from level_1_rules
        to s_5_0
    end
/* hex 6 */
    connect
        from terrain_type_6
        to level_1_rules
    end
    connect
        from rocks_6
        to level_1_rules
    end
    connect
        from level_1_rules
        to s_6_0
    end
/* level 2 rule connections */
    connect
        from s_0_0
        to level_2_rules
    end
    connect
        from s_1_0
        to level_2_rules
    end
    connect
        from slope_d1
        to level_2_rules
    end
    connect
        from level_2_rules
        to s_0_d1
    end
/* d1 */
    connect
        from s_0_0
        to level_2_rules
    end
    connect
        from s_2_0
        level_2_rules
    end
    connect
        from slope_d2
        to level_2_rules
    end
    connect
        from level_2_rules
        to s_0_d2
    end
/* d3 */
    connect
        from s_0_0
        to level_2_rules
    end
    connect
        from s_3_0
        to level_2_rules
    end
    connect
        from slope_d3
        to level_2_rules
    end
    connect
        from level_2_rules
        to s_0_d3
    end
/* d4 */
    connect
        from s_0_0
        to level_2_rules
    end
    connect
        from s_4_0
        to level_2_rules
```

```
    end
connect
    from slope_d4
    to level_2_rules
end
connect
    from level_2_rules
    to s_0_d4
end
/* d5 */
connect
    from s_0_0
    to level_2_rules
end
connect
    from s_5_0
    to level_2_rules
end
connect
    from slope_d5
    to level_2_rules
end
connect
    from level_2_rules
    to s_0_d5
end
/* d6 */
connect
    from s_0
    to level_2_rules
end
connect
    from s_6_0
    to level_2_rules
end
connect
    from slope_d6
    to level_2_rules
end
connect
    from level_2_rules
    to s_0_d6
end
/* level 3 rule connections */
connect
    from s_0_0
    to level_3_rules
end
connect
    from s_1_0
    to level_3_rules
end
connect
    from s_2_0
    to level_3_rules
end
connect
    from s_3_0
    to level_3_rules
end
connect
    from s_4_0
    to level_3_rules
end
connect
    from s_5_0
    to level_3_rules
end
connect
    from s_6_0
    to level_3_rules
end
connect
    from level_3_rules
    to ws_0
end
/* level 4 rule connections */
connect
    from s_0_d1
    to level_4_rules
end
connect
    from s_0_d2
    to level_4_rules
end
connect
    from s_0_d3
    to level_4_rules
end
connect
    from s_0_d4
    to level_4_rules
end
connect
    from s_0_d5
    to level_4_rules
end
connect
    from s_0_d6
    to level_4_rules
end
connect
    from level_4_rules
    to ws_d1
end
connect
    from level_4_rules
    to ws_d2
end
connect
    from level_4_rules
    to ws_d3
end
connect
    from level_4_rules
    to ws_d4
end
connect
    from level_4_rules
    to ws_d5
end
connect
    from level_4_rules
    to ws_d6
end
/* level 5 rule connections */
connect
    from ws_0
    to level_5_rules
end
connect
    from ws_d1
    to level_5_rules
end
connect
    from ws_d2
    to level_5_rules
end
connect
    from ws_d3
    to level_5_rules
end
connect
    from ws_d4
    to level_5_rules
end
connect
    from ws_d5
    to level_5_rules
end
connect
    from ws_d6
    to level_5_rules
end
connect
    from level_5_rules
    to fs_d1
end
connect
    from level_5_rules
    to fs_d2
end
connect
    from level_5_rules
```

```
        to fs_d3
    end
    connect
        from level_5_rules
        to fs_d4
    end
    connect
        from level_5_rules
        to fs_d5
    end
    connect
        from level_5_rules
        to fs_d6
    end
end /* end of navigation project */
```

What is claimed is:

1. In a navigation system for a semi-autonomous vehicle comprising sensors for sensing conditions on terrain within sensor range and producing raw image data about said terrain, and an image understanding module for extracting features from said raw data in the form of feature data for a plurality of local regions on said terrain, a method for processing said feature data to determine the relative safety of moving said semi-autonomous vehicle from each said local region to an adjacent local region, said method comprising the steps of:

defining linguistic variables for each of said features using fuzzy membership distributions;

defining fuzzy rules which determine a safety value for a given combination of values for said linguistic variables; and for each local region, inputting values for said linguistic variables to said fuzzy rules and determining an output safety value using a fuzzy inference process.

2. In a navigation system for a semi-autonomous vehicle comprising sensors for sensing conditions on terrain within sensor range and producing raw image data about said terrain, and an image understanding module for extracting features from said raw data in the form of feature data for a plurality of local regions on said terrain, a method for processing said feature data to determine the relative safety of moving said semi-autonomous vehicle from said local region to an adjacent local region, said method comprising the steps of:

(a) defining linguistic variables for each of said features using fuzzy membership distributions;

(b) defining fuzzy rules which determine regional safety values and directional safety values for given combinations of values for said linguistic variables for a plurality of local regions;

(c) inputting values for said linguistic variables for one said local region and adjacent local regions to said fuzzy rules and determining a plurality of directional safety values for said local region; and (d) repeating step (c) for each local region on said terrain.

3. The method of claim 2 wherein said fuzzy rules are organized into a plurality of levels and wherein the outputs of each lower level are inputs to a higher level.

4. The method of claim 3 wherein regional safety values and directional safety values of a local region affect regional and directional safety values for adjacent local regions at a plurality of levels.

5. In a navigation system for a semi-autonomous vehicle comprising sensors for sensing conditions on terrain within sensor range and producing raw image data about the terrain, and an image understanding module for extracting features from the raw data in the form of feature data for a plurality of local regions on the terrain, a method for processing the feature data for determining the relative safety of moving the vehicle from one local region to an adjacent local region, the method comprising the steps of:

considering the terrain as represented by a cluster of seven hexes having a center hex adjacent to each of six other hexes;

determining a regional safety value for each hex of the cluster in response to respective characteristics of the feature data for each hex of the cluster; and determining a respective directional safety value for traveling from the center hex to each of the other hexes of the cluster in response to the regional safety value of the center hex and of the corresponding adjacent hex of the cluster.

6. The method as in claim 5, further including determining an updated regional safety value for the center hex in response to the regional safety values of the other hexes of the cluster.

7. The method as in claim 6, further including determining a respective first updated directional safety value for traveling from the center hex to each of the other hexes in the cluster in response to the directional safety values.

8. The method as in claim 7, further including determining a respective second updated directional safety value for traveling from the center hex to each of the other hexes in the cluster in response to the first updated directional safety values and the updated regional safety value of the center hex.

9. The method as in claim 5 wherein the characteristics of the feature data are selected from the group consisting of dust, loose sand, packed sand, loose gravel, packed gravel, rocks, slope of terrain between adjacent hexes and combinations thereof.

* * * * *